United States Patent
Wang et al.

(10) Patent No.: US 7,756,419 B2
(45) Date of Patent: Jul. 13, 2010

(54) TRAFFIC SIGNAL NODE CROSS SCHEDULING METHOD AND SYSTEM

(75) Inventors: Buyun Wang, Shenzhen (CN); Zhiyong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 461 days.

(21) Appl. No.: 11/828,924

(22) Filed: Jul. 26, 2007

(65) Prior Publication Data

US 2008/0085116 A1    Apr. 10, 2008

(30) Foreign Application Priority Data

Oct. 8, 2006    (CN) .......................... 2006 1 0139088
Nov. 2, 2006    (CN) .......................... 2006 1 0138024

(51) Int. Cl.
*H04J 14/02*    (2006.01)
(52) U.S. Cl. ............................ 398/83; 398/79; 398/48; 398/47; 398/54; 385/24; 385/16; 385/18
(58) Field of Classification Search ................... 398/45, 398/46, 47, 48, 49, 50, 52, 54, 56, 59, 79, 398/83, 82; 385/24, 16, 17, 18
See application file for complete search history.

(56) References Cited

U.S. PATENT DOCUMENTS

| 6,333,799 | B1 | 12/2001 | Bala et al. | |
| 6,792,208 | B1 * | 9/2004 | Mukherjee et al. | ............ 398/52 |
| 2002/0054407 | A1 * | 5/2002 | Yamada et al. | ............ 359/128 |
| 2003/0185565 | A1 | 10/2003 | Wang et al. | |
| 2007/0264015 | A1 | 11/2007 | Li et al. | |

FOREIGN PATENT DOCUMENTS

| CN | 1791278 A | 6/2006 |
| CN | 1832383 A | 9/2006 |

OTHER PUBLICATIONS

Cao et al., "Multi-Layer versus Single-Layer Optical Cross-connect Architectures for Waveband Switching," *IEEE (Twenty-Third Annual Joint Conference of the IEE Computer and Communications Societies)*, 3: 1830-1840 (Mar. 2004).

(Continued)

*Primary Examiner*—Hanh Phan
(74) *Attorney, Agent, or Firm*—Leydig, Voit & Mayer, Ltd.

(57) ABSTRACT

A traffic signal node cross scheduling method includes: decomposing a multi-wavelength signal into multiple first single-wavelength signals; decomposing a first single-wavelength signal into multiple small-granularity wavelength signals; scheduling the multiple small-granularity wavelength signals; and converging the multiple small-granularity wavelength signals after scheduled into a second single-wavelength signal. A traffic signal node cross scheduling system is also provided by the embodiments of the present invention. According to the traffic signal node cross scheduling method and system provided by the embodiments of the present invention, one scheduling matrix may be used to implement the scheduling of the wavelength and sub-wavelength traffics, which improves the integration of the network node cross scheduling system and the utilization rate of the scheduling matrix, and reduces the hardware cost of the network node cross scheduling system.

15 Claims, 5 Drawing Sheets

OTHER PUBLICATIONS

Ho et al., "Path Selection with Tunnel Allocation in the Optical Internet Based on Generalized MPLS Architecture," *IEEE (International Conference on Communications)*, 1:2697-2701 (Apr. 2002).

Izmailov et al., "Hybrid Hierarchical Optical Networks," *IEEE Communications Magazine*, 4(11): 88-94 (Nov. 2002).

Kolarov et al., "Impact of Waveband Switching on Dimensioning Multi-Granular Hybrid Optical Networks," *Optical Network Design and Modeling*, 371-381 (Feb. 2005).

Yao et al., Design of Hybrid Optical Networks with Waveband and Electrical TDM Switching, GLOBECOM 2003 (IEEE Global Telecommunications Conference, 7: 2803-2808 (Dec. 2003).

* cited by examiner

TRAFFIC SIGNAL NODE CROSS SCHEDULING METHOD AND SYSTEM

This application claims priority to Chinese Patent Application No. 200610139088.0, filed Oct. 8, 2006, and Chinese Patent Application No. 200610138024.9, filed Nov. 2, 2006, both of which are hereby incorporated by reference.

FIELD OF THE INVENTION

The present invention relates to the communication technology in optical networks, and more particularly, to a traffic signal node cross scheduling method and system in a Wave Division Multiplexing (WDM) optical network.

BACKGROUND OF THE INVENTION

Along with the development of science and technology, the amount of information transmission in modern communication systems increases rapidly, which requires higher capacity of transmission networks and a stronger ability of a network element to schedule traffics. In the middle of 90's, the WDM technology becomes a main technology in long-distance and region backbone transmission networks, and is applied in Metropolitan Area Networks (MANs) gradually. Traditional WDM systems employ separate device encapsulation, in which board cards are made around one or more optical devices, and the board cards are connected with each other through fibers.

With the development of technology, the price of optical devices is gradually reduced. However the cost of optical device encapsulation is still high, which is a bottleneck for the cost of optical devices. In a typical example, a core of a laser only needs several dollars, but its encapsulation costs hundreds of dollars.

In the last several years, people make efforts to integrate multiple optical devices such as a laser, a modulator and a multiplexing/de-multiplexing apparatus, so as to decrease the cost of optical devices. Additionally, the size of optical devices may be reduced as a result of decreasing encapsulation. At present, the optical integration technology is gradually mature, and is able to converge multiple single-wavelength signals into a multi-wavelength signal at one substrate and de-converge a multi-wavelength signal into multiple single-wavelength signals.

WDM devices may implement traffic transmission with large capacity. However, traditional WDM devices are mainly applied to point-to-point traffic transmission, and cannot implement flexible traffic scheduling. In order to improve the flexibility of traffic scheduling, new traffic scheduling technologies based on optical layer are put forward. Unfortunately, the cost of these traffic scheduling technologies based on optical layer is high, and the flexibility of traffic scheduling still cannot meet real requirements.

In order to provide more flexible network applications for the WDM devices, the traffic scheduling includes traffic scheduling in a wavelength plane and traffic scheduling in a sub-wavelength plane in the related art, and the wavelength traffic scheduling and sub-wavelength traffic scheduling are implemented by means of electric cross-connection.

Figure 1:
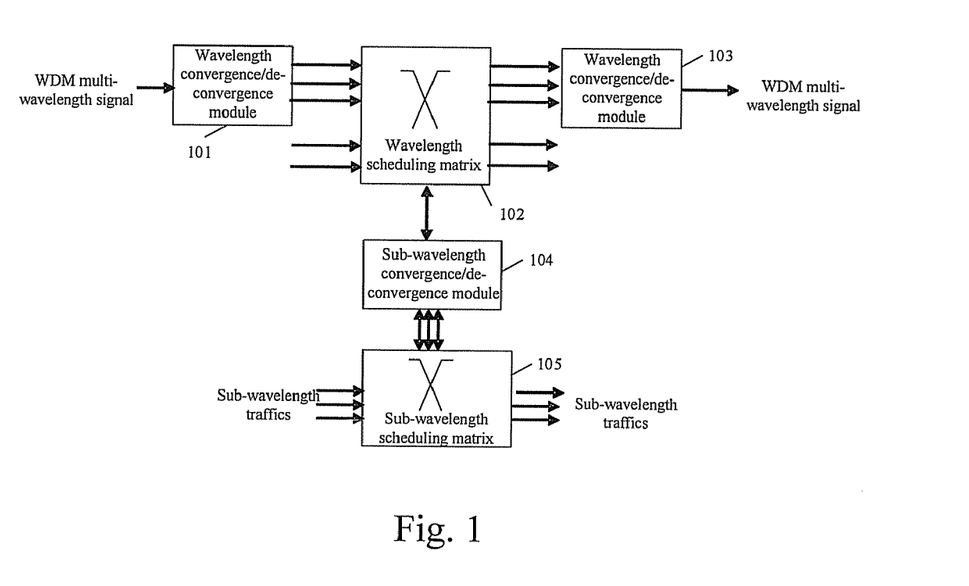
FIG. 1 is a simplified diagram illustrating a structure of a WDM node cross scheduling system in the related art.

FIG. 1 is a simplified diagram illustrating a structure of a conventional WDM node cross scheduling system. The system includes wavelength convergence/de-convergence module 101 in an input direction, wavelength scheduling matrix 102, wavelength convergence/de-convergence module 103 in an output direction, sub-wavelength convergence/de-convergence 104, and sub-wavelength scheduling matrix 105.

Wavelength convergence/de-convergence module 101 decomposes a multi-wavelength signal received from a WDM transmission line into multiple independent $\lambda$-wavelength signals, and transfers the multiple independent $\lambda$-wavelength signals to wavelength scheduling matrix 102.

Wavelength scheduling matrix 102 sends those $\lambda$-wavelength signals not needing to be performed sub-wavelength scheduling to wavelength convergence/de-convergence module 103 after performing uniform scheduling for the multiple independent $\lambda$-wavelength signals received from wavelength convergence/de-convergence module 101. Wavelength convergence/de-convergence module 103 sends the received $\lambda$-wavelength signals to an output line after converging the received $\lambda$-wavelength signals.

Wavelength scheduling matrix 102 sends those $\lambda$-wavelength signals needing to be performed sub-wavelength scheduling to sub-wavelength convergence/de-convergence module 104.

Sub-wavelength convergence/de-convergence module 104 decomposes the received $\lambda$-wavelength signals into sub-wavelength traffics independent from each other, and sends the sub-wavelength traffics to sub-wavelength scheduling matrix 105.

Sub-wavelength scheduling matrix 105 performs the sub-wavelength scheduling for the received sub-wavelength traffics.

In the related art, a two-level scheduling structure is used, in which wavelength scheduling matrix 102 and sub-wavelength scheduling matrix 105 are combined. Thus, a channel must be provided to interconnect wavelength scheduling matrix 102 and sub-wavelength scheduling matrix 105. It can be seen from the system as shown in FIG. 1 that sub-wavelength convergence/de-convergence module 104 is configured between wavelength scheduling matrix 102 and sub-wavelength scheduling matrix 105 as a interconnecting channel, which results in the low integration and utilization rate of the network node cross scheduling system and the high hardware cost of the network node cross scheduling system.

Additionally, the interconnecting channel between wavelength scheduling matrix 102 and sub-wavelength scheduling matrix 105 becomes a bottleneck of traffic scheduling and greatly reduces the access ability of the network node cross scheduling system. In order to guarantee the flexibility of traffic scheduling in the network node cross scheduling system, an interconnecting channel with a bandwidth large enough must be designed. However, the larger the bandwidth of the interconnecting channel is, the higher the cost of the interconnecting channel is.

SUMMARY OF THE INVENTION

Embodiments of the present invention provide a traffic signal node cross scheduling method to improve the integration of the network node cross scheduling system and the utilization rate of the scheduling matrix.

Embodiments of the present invention provide a traffic signal node cross scheduling system to improve the integration of the network node cross scheduling system and the utilization rate of the scheduling matrix and reduce the hardware cost of the network node cross scheduling system.

Embodiments of the present invention also provide a traffic signal node cross scheduling system in an optical electric integrated circuit to improve the integration of the network node cross scheduling system and the utilization rate of the scheduling matrix, and reduce the hardware cost of the network node cross scheduling system.

A traffic signal node cross scheduling method includes:

decomposing a multi-wavelength signal into multiple first single-wavelength signals;

decomposing a first single-wavelength signal into multiple small-granularity wavelength signals;

scheduling the multiple small-granularity wavelength signals; and converging the multiple small-granularity wavelength signals after scheduled into a second single-wavelength signal.

A traffic signal node cross scheduling system includes:

a wavelength convergence/de-convergence module, for decomposing a first multi-wavelength signal into multiple first single-wavelength signals, or multiplexing multiple second single-wavelength signals into a second multi-wavelength signal;

a wavelength processing unit, for decomposing a first single-wavelength signal outputted by the wavelength convergence/de-convergence module into multiple small-granularity wavelength signals, and outputting the multiple small-granularity wavelength signals; or converging the multiple small-granularity wavelength signals after scheduled into a second single-wavelength signal, and sending the second single-wavelength signal to the wavelength convergence/de-convergence module; and a scheduling matrix, for scheduling the multiple small-granularity wavelength signals outputted by the wavelength processing unit uniformly, and sending the multiple small-granularity wavelength signals after scheduled to the wavelength processing unit.

A traffic signal node cross scheduling system in an optical electric integrated circuit includes:

a wavelength convergence/de-convergence module, for decomposing a first multi-wavelength signal into multiple first single-wavelength signals, and multiplexing multiple second single-wavelength signals into a second multi-wavelength signal;

a wavelength processing unit, for decomposing a first single-wavelength signal outputted by the wavelength convergence/de-convergence module into multiple small-granularity wavelength signals, and outputting the multiple small-granularity wavelength signals; or converging the small-granularity wavelength signals after scheduled into a second single-wavelength signal, and sending the second single-wavelength signal to the wavelength convergence/de-convergence module; and a scheduling matrix, for scheduling the multiple small-granularity wavelength signals outputted by the wavelength processing unit uniformly, and sending the small-granularity wavelength signals after scheduled to the wavelength processing unit.

It can be seen from the technical solution in accordance with the embodiments of the present invention that, by the traffic signal node cross scheduling method and systems, a multi-wavelength signal is decomposed and consolidated, thereby one scheduling matrix may be used to replace the wavelength scheduling matrix and sub-wavelength scheduling matrix independent from each other of the related art, and further implement uniform scheduling of the wavelength and sub-wavelength traffics. As a result, the integration of the network node cross scheduling system and the utilization rate of the scheduling matrix are greatly improved, and the hardware cost of the node cross scheduling system is decreased.

Additionally, in the traffic signal node cross scheduling method and systems, one scheduling matrix is used to implement the uniform scheduling of the wavelength and sub-wavelength traffics, which avoids the bottleneck of traffic scheduling resulting from the interconnecting channel between multiple scheduling planes in the two-level scheduling structure of the wavelength and sub-wavelength traffics, and greatly improves the flexibility of traffic scheduling in the node cross scheduling system.

DETAILED DESCRIPTION OF THE INVENTION

The embodiments of the present invention are further described with reference to the accompanying drawings.

According to the traffic signal node cross scheduling method and systems provided by the embodiments of the present invention, a multi-wavelength signal is decomposed and consolidated so as to use one scheduling matrix to implement the uniform scheduling of the wavelength and sub-wavelength traffics.

The traffic signal node cross scheduling method according to the embodiments of the present invention includes the following processes.

After a multi-wavelength signal is decomposed into single-wavelength signals, decompose each of the single-wavelength signals into multiple small-granularity wavelength signals.

The process of decomposing each of the single-wavelength signals into multiple small-granularity wavelength signals mentioned herein includes: after it is determined that a single-wavelength signal needs to be performed wavelength scheduling, splitting the single-wavelength signal into multiple low-rate signals; or after it is determined that a single-wavelength signal includes multiple sub-wavelength traffics and there are sub-wavelength traffics needing to be scheduled at the current node, decomposing the single-wavelength signal into sub-wavelength traffics.

Uniformly schedule all small-granularity wavelength signals decomposed from the single-wavelength signal.

The process of uniformly scheduling all small-granularity wavelength signals decomposed from the single-wavelength signal includes: scheduling each of the sub-wavelength traffics decomposed from the single-wavelength signal independently; or scheduling the multiple low-rate signals decomposed from the single-wavelength signal according to a uniform path.

Converge the small-granularity wavelength signals after scheduled into the single-wavelength signal.

The process of converging the small-granularity wavelength signals after scheduled into the single-wavelength signal includes: restoring the multiple low-rate signals to the single-wavelength signal before split; and converging the sub-wavelength traffics which have been scheduled and do not need to be downloaded at the current node and sub-wavelength traffics uploaded at the current node into a single-wavelength signal.

Figure 2:
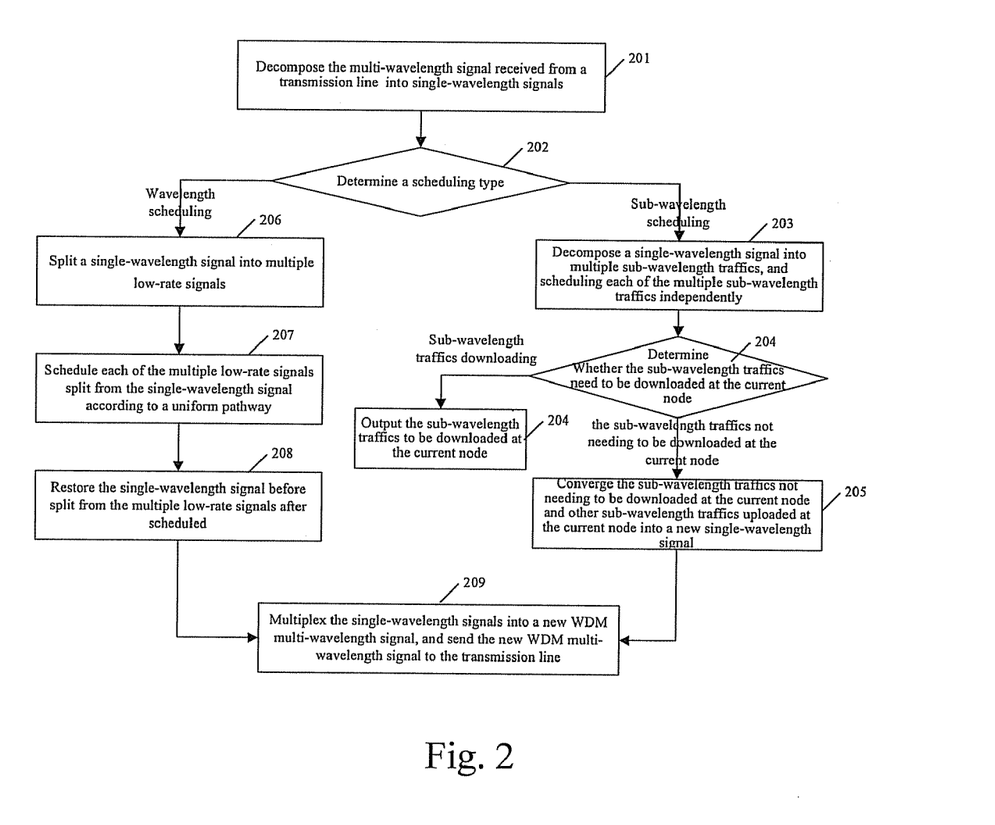
FIG. 2 is a simplified flow chart illustrating a traffic signal node cross scheduling method according to an embodiment of the present invention.

FIG. 2 is a simplified flow chart illustrating a traffic signal node cross scheduling method according to an embodiment of the present invention, which includes the following processes.

Process 201: Decompose a multi-wavelength signal received from a transmission line into single-wavelength signals.

Process 202: Determine a wavelength scheduling type.

If it is determined that a single-wavelength signal needs to be performed sub-wavelength scheduling, that is, the single-wavelength signal includes multiple sub-wavelength signals, and each of the multiple sub-wavelength signals needs to be scheduled independently, proceed to Process 203; if it is determined that the single-wavelength signal needs to be performed wavelength scheduling, proceed to Process 206.

Process 203: Decompose the single-wavelength signal into multiple sub-wavelength traffics, and schedule each of the multiple sub-wavelength traffics independently.

Process 204: Determine whether the sub-wavelength traffics need to be downloaded at the current node; if yes, output those sub-wavelength traffics needing to be downloaded at the current node; otherwise, proceed to Process 205.

Process 205: Converge those sub-wavelength traffics not needing to be downloaded at the current node and those sub-wavelength traffics uploaded at the current node into a new single-wavelength signal, and proceed to Process 209.

Process 206: Split the single-wavelength signal needing to be performed the wavelength scheduling into multiple low-rate signals.

In this process, the single-wavelength signal needing to be performed the wavelength scheduling is split into multiple low-rate signals which may be scheduled by a sub-wavelength scheduling matrix.

The single-wavelength signal may be split into multiple low-rate signals in a serial-to-parallel conversion manner.

Process 207: Schedule the multiple low-rate signals split from each of the single-wavelength signals needing to be performed the wavelength scheduling according to a uniform path.

Process 208: Restore the multiple low-rate signals after scheduled to the single-wavelength signal before split.

Herein, the process of restoring the multiple scheduled low-rate signals to the single-wavelength signal before split may be implemented in a parallel-to-serial conversion manner.

Process 209: Multiplex the single-wavelength signal converged in Process 205 and the single-wavelength signal restored in Process 208 into a new WDM multi-wavelength signal, and send the WDM multi-wavelength signal to the transmission line.

The embodiments of the present invention also provide a traffic signal node cross scheduling system, which includes a wavelength convergence/de-convergence module, a scheduling matrix and at least one wavelength processing unit.

The wavelength convergence/de-convergence module is used for decomposing a multi-wavelength signal into single-wavelength signals, and multiplexing received single-wavelength signals into a multi-wavelength signal.

The wavelength processing unit is used for decomposing each of the single-wavelength signals outputted from the wavelength convergence/de-convergence module into multiple small-granularity wavelength signals, and sending the multiple small-granularity wavelength signals to the scheduling matrix.

The wavelength processing unit is also used for converging small-granularity wavelength signals after scheduled into a single-wavelength signal, and sending the single-wavelength signal to the wavelength convergence/de-convergence module.

The scheduling matrix is used for scheduling all small-granularity wavelength signals sent from the wavelength processing unit uniformly, and sending the scheduled small-granularity wavelength signals to the wavelength processing unit.

The wavelength processing unit may include a first wavelength processing unit and a second wavelength processing unit. The first wavelength processing unit is used for decomposing a single-wavelength signal outputted from the wavelength convergence/de-convergence module into multiple small-granularity wavelength signals, and sending the multiple small-granularity wavelength signals to the scheduling matrix; and the second wavelength process unit is used for converging the scheduled small-granularity wavelength signals into the single-wavelength signal, and sending the single-wavelength signal to the wavelength convergence/de-convergence module.

Figure 3:
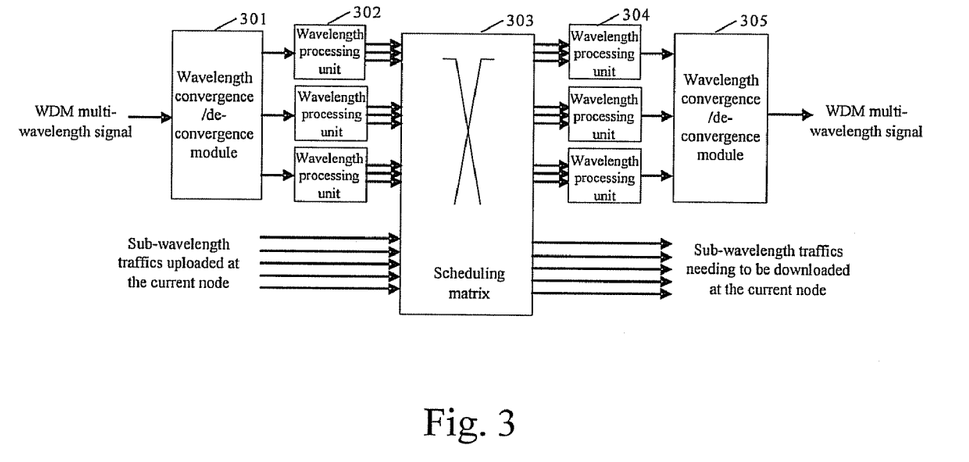
FIG. 3 is a simplified diagram illustrating a structure of a traffic signal node cross scheduling system according to an embodiment of the present invention.

FIG. 3 is a simplified diagram illustrating a structure of s traffic signal node cross scheduling system in accordance with an embodiment of the present invention, which includes:

wavelength convergence/de-convergence module 301 in an input direction, at least one wavelength processing unit 302 in the input direction, scheduling matrix 303, at least one wavelength processing unit 304 in an output direction, and wavelength convergence/de-convergence module 305 in the output direction.

At least one wavelength processing unit 302 and 304 mentioned herein respectively correspond to the first wavelength processing unit and the second processing unit which are included in the above-mentioned wavelength processing unit of the traffic signal node cross scheduling system.

Wavelength convergence/de-convergence module 301 is used for decomposing a multi-wavelength signal received from the transmission line into single-wavelength signals, and outputting each of the single-wavelength signals to one wavelength processing unit 302. One wavelength processing unit 302 processes one single-wavelength signal.

Wavelength processing unit 302 is used for splitting the received single-wavelength signal into multiple low-rate signals when determining that the received single-wavelength signal needs to be performed wavelength scheduling, and sending the multiple low-rate signals to scheduling matrix 303; or wavelength processing unit 302 decomposes the received single-wavelength signal into multiple sub-wavelength traffics when determining that the received single-wavelength signal includes multiple sub-wavelength traffics and there are sub-wavelength traffics needing to be scheduled at the current node, and sends the multiple sub-wavelength traffics to scheduling matrix 303.

Scheduling matrix 303 is used for scheduling each of the received sub-wavelength traffics independently, forwarding those sub-wavelength traffics needing to be downloaded at the current node to a sub-wavelength output port; and outputting those sub-wavelength traffics not needing to be downloaded at the current node and those sub-wavelength traffics uploaded at the current node to wavelength processing unit 304.

Scheduling matrix 303 may also be used for scheduling the received multiple low-rate signals according to a uniform path, and sending the multiple low-rate signals to wavelength processing unit 304.

Wavelength processing unit 304 is used for converging the received sub-wavelength traffics into a new single-wavelength signal, and sending the new single-wavelength signal to wavelength convergence/de-convergence module 305; or restoring the received low-rate signals to the single-wavelength signal before split, and sending the sub-wavelength signal to wavelength convergence/de-convergence module 305.

Wavelength convergence/de-convergence module 305 is used for multiplexing each of received single-wavelength signals into a new WDM multi-wavelength signal, and sending the new WDM multi-wavelength signal to the transmission line.

Wavelength convergence/de-convergence modules 301 and 305 in the present embodiment may be configured in one module.

Figure 4:
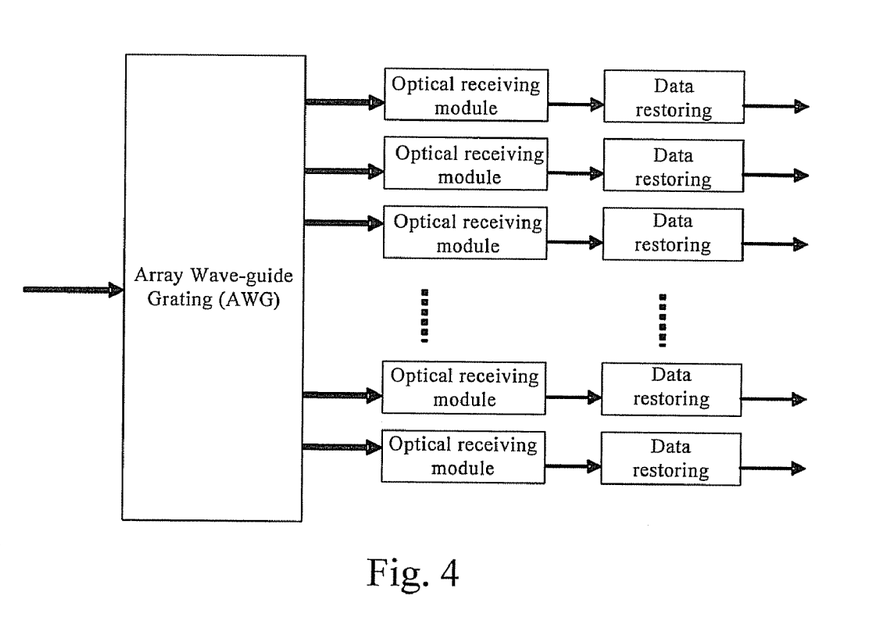
FIG. 4 is a simplified diagram illustrating a structure of a wavelength convergence/de-convergence module as shown in FIG. 3 according to an embodiment of the present invention, which is implemented using an optical electric integrated circuit.

If the traffic signal node cross scheduling system is implemented in an optical electric integrated circuit, wavelength convergence/de-convergence module 301 of the system as shown in FIG. 3 may be implemented using an optical electric integrated circuit. Wavelength convergence/de-convergence module 301 is composed of a wavelength de-convergence unit, an optical receiving module and a data restoring unit. The wavelength de-convergence unit may be implemented using an Array Wave-guide Grating (AWG), as shown in FIG. 4. The optical receiving module includes one or more Photo Diode (PD) chip arrays, and the PD may be a PIN diode or an Avalanche Photo Diode (APD).

The AWG is used to decompose one-path signal into multi-path signals, has an input port and multiple output ports, and is made based on waveguide. Each output port has a centre wavelength and a pass band which accord with some standards such as ITU-T standard. Alternatively, the AWG may be replaced by other devices with the same functions, such as an N 1 Planar Lightwave Circuit (PLC) waveguide multiplexer, star multiplexer, Multi-mode Interferometry (MMI), etc. Generally, an Erbium Doped Fiber Amplifier (EDFA) or an Erbium Doped Waveguide Amplifier (EDWA) may be added to compensate for the optical loss of the AWG.

The optical receiving module is used for converting an optical signal to an electric signal. The optical signal is converted to the electric signal after passing through the optical receiving module, and then the electric signal reaches the wavelength processing unit via the data restoring unit. The data restoring unit is used to amplify and re-generate the electric signal, and is composed of an electric signal amplifier and an electric signal clock data restoring circuit.

Figure 5:
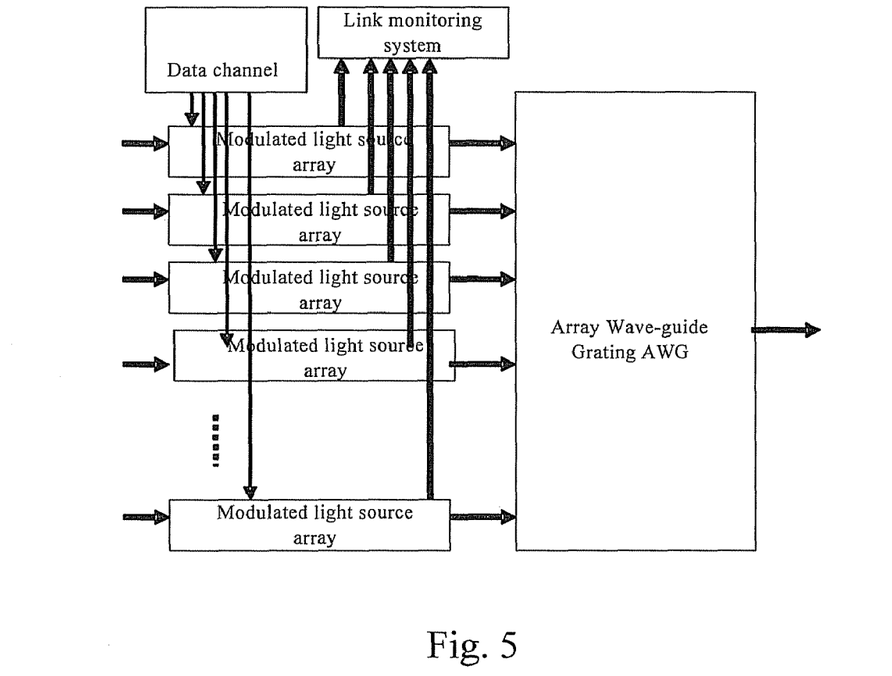
FIG. 5 is a simplified diagram illustrating a structure of a wavelength convergence/de-convergence module as shown in FIG. 3 according to an embodiment of the present invention, which is implemented using an optical electric integrated circuit.

Wavelength convergence/de-convergence module 305 in the system as shown in FIG. 3 may be implemented using an optical electric integrated circuit, and is composed of a wavelength convergence unit, one or more modulated light source arrays, and a data channel, as shown in FIG. 5.

Each modulated light source array is connected with a wavelength processing unit as shown in FIG. 3 through the data channel, receives the signal sent from wavelength process unit 304 through the data channel, and then sends the modulated signal to the AWG.

The AWG is used to consolidate multi-path signals into one-path signal, has multiple input ports and an output port, and is made based on waveguide. Each input port has a centre wavelength and a pass band which accord with some standards such as ITU-T standard. The AWG may be replaced by other devices with the same functions, such as an N 1 PLC waveguide multiplexer, star multiplexer, MMI, etc. Generally, an EDFA or an EDWA may be added to compensate for the optical loss of the AWG.

Wavelength convergence/de-convergence module 305 may include a link monitoring system which is connected with each modulated light source array, and is used for detecting the performance of optical signals acquired from the each modulated light source array during the transmission of the optical signals on the optical link.

In FIG. 5, the heavy solid line denotes transmission paths of an optical signal, while the thin solid line denotes transmission paths of an electric signal. The system is integrated on one semiconductor substrate. The multiple modulated light source arrays use light sources with a fixed wavelength which may change a little range with temperature.

Figure 6:
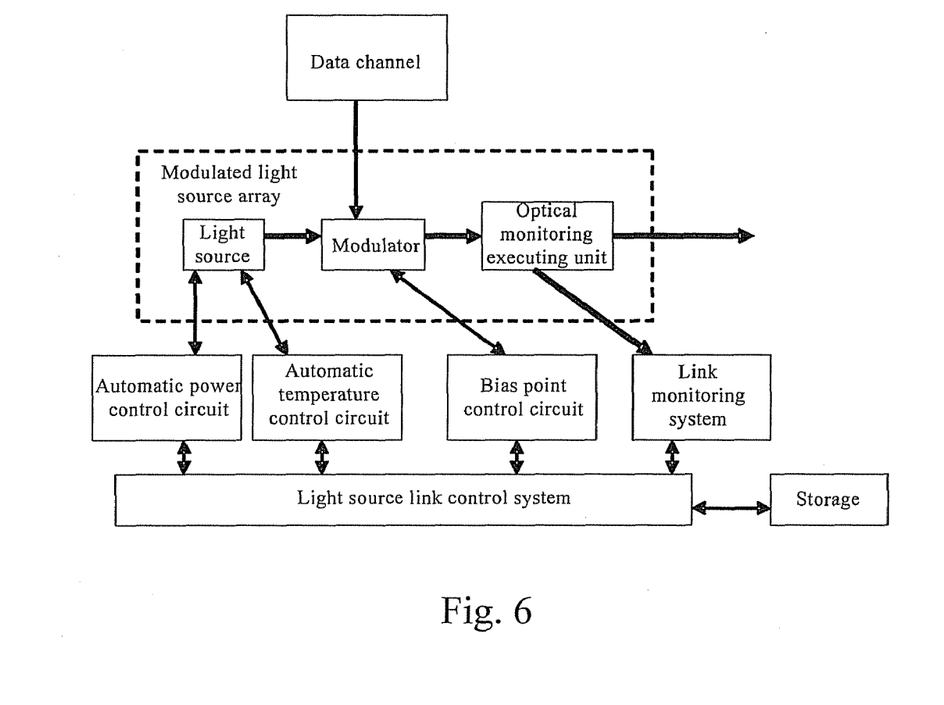
FIG. 6 is a simplified diagram illustrating a structure of a modulated light source array as shown in FIG. 5 according to an embodiment of the present invention.

Each modulated light source array as shown in FIG. 5 is composed of a light source, a modulator, an optical monitoring executing unlit and a corresponding peripheral circuit, which is as shown in FIG. 6.

As can be seen from FIG. 6, the modulator is connected with the data channel and is used to modulate data. The modulator may be an Electro Absorption (EA) modulator or a Mach Zehnder (MZ) modulator. The modulator has a data control port which may be welded to a pin of the optical integrated circuit through a lead wire, and then is connected with the data channel. The data of the data channel is loaded into an optical signal emitted by the light source through the modulator. If the light source is directly modulated by the data, the modulator may be omitted.

The corresponding peripheral circuit includes an automatic temperature control circuit and an automatic power control circuit. A fixed light source link of the modulator includes a link monitoring system to monitor the optical power, spectrum of the whole link, and so on. There are multiple methods for implementing the link monitoring system. A simple link monitoring circuit may separate a little portion of optical signals, e.g., 5% of optical signals, at the end of the fixed light source link through a light monitoring executing unit, so as to monitor the performance of the whole link by monitoring the performance of this portion of optical signals such as the optical power, spectrum and so on. A complicated link monitoring system may have multiple optical monitoring executing units on the transmission path of optical signals to separate a little portion of optical signals, so as to monitor the performance of the optical signals during the transmission of the optical signals on the whole optical link. The optical monitoring executing unit sends the processed optical signals to the AWG.

It can be seen from the system as shown in FIG. 3 that, according to the embodiments of the present invention, one scheduling matrix is used to replace the sub-wavelength scheduling matrix and wavelength scheduling matrix independent from each other in the related art. Therefore, the system as shown in FIG. 3 may implement the scheduling of the sub-wavelength and wavelength traffics.

Figure 7:
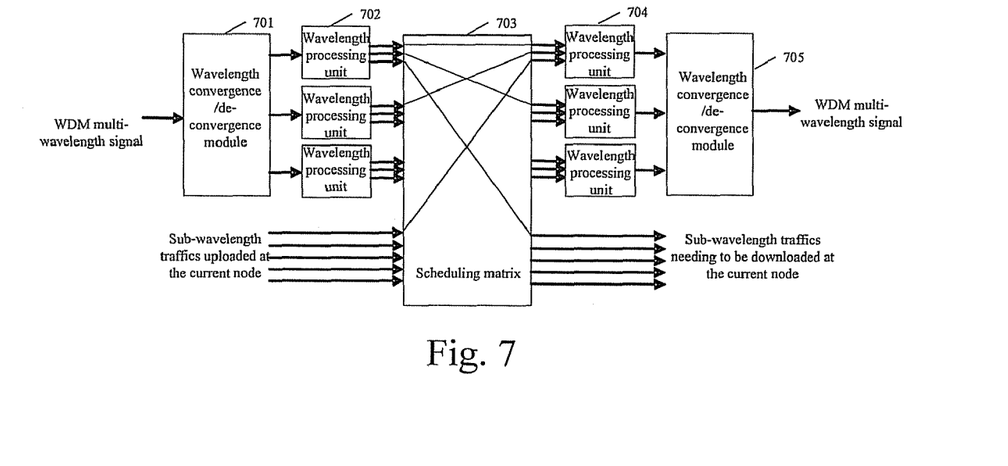
FIG. 7 is a simplified schematic diagram of implementing sub-wavelength scheduling using the system as shown in FIG. 3 according to an embodiment of the present invention.

FIG. 7 is a simplified schematic diagram of implementing sub-wavelength scheduling using the system as shown in FIG. 3. Each wavelength processing unit 702 decomposes a received single-wavelength signal into multiple sub-wavelength traffics after determining that the received single-wavelength signal includes multiple sub-wavelength traffics and there are sub-wavelength traffics needing to be scheduled at the current node, and sends the multiple sub-wavelength traffics to scheduling matrix 703. Scheduling matrix 703 schedules each of the received sub-wavelength traffics independently, and forwards the sub-wavelength traffics needing to be downloaded at the current node to a sub-wavelength output port; and outputs the sub-wavelength traffics not needing to be downloaded at the current node and those sub-wavelength traffics uploaded at the current node to wavelength processing unit 704. Each wavelength processing unit 704 converges the received sub-wavelength traffics into a new single-wavelength signal, and sends the new single-wavelength signal to wavelength convergence/de-convergence module 705. Wavelength convergence/de-convergence module 705 multiplexes the received single-wavelength signals into a new WDM multi-wavelength signal, and sends the new WDM multi-wavelength signal to the transmission line.

Figure 8:
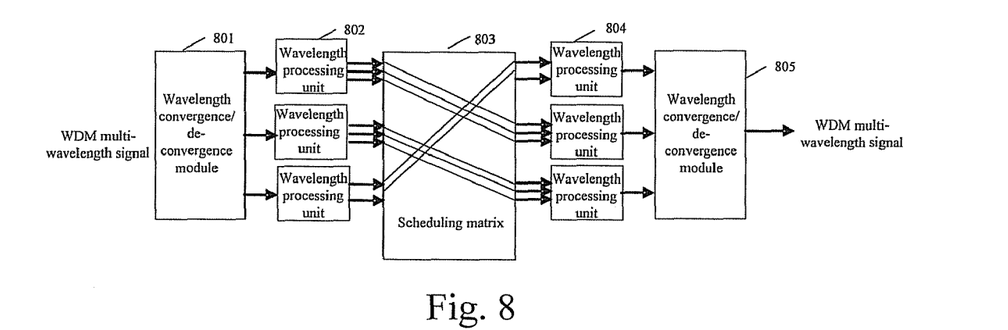
FIG. 8 is a simplified schematic diagram of implementing wavelength scheduling using the system as shown in FIG. 3 according to an embodiment of the present invention.

FIG. 8 is a simplified schematic diagram of implementing wavelength scheduling using the system as shown in FIG. 3. Wavelength processing unit 802 splits a received single-wavelength signal into multiple low-rate signals when determining that the single-wavelength signal needs to be performed wavelength scheduling, and then sends the multiple low-rate signals to scheduling matrix 803. Scheduling matrix 803 is used to schedule the received multiple low-rate signals according to a uniform path, and send the scheduled multiple low-rate signals to wavelength processing unit 804. Wavelength processing unit 804 restores the received multiple low-rate signals to the single-wavelength signal before split, and sends the single-wavelength signal to wavelength convergence/de-convergence module 805. Wavelength convergence/de-convergence module 805 restores received multiple single-wavelength signals to a new WDM multi-wavelength signal, and sends the new WDM multi-wavelength signal to the transmission line.

Figure 9:
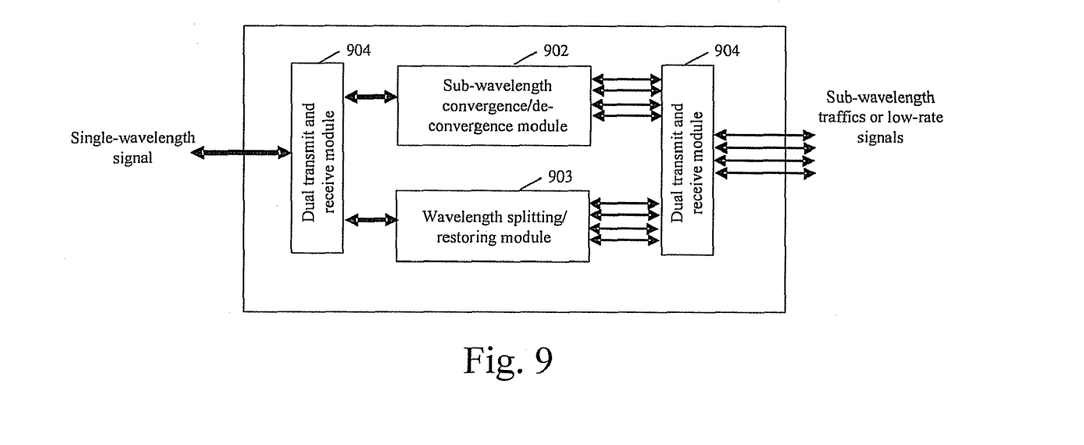
FIG. 9 is a simplified diagram illustrating a structure of a wavelength processing unit in the system as shown in FIG. 3 according to an embodiment of the present invention.

FIG. 9 is a diagram illustrating a structure of the wavelength processing unit of the system as shown in FIG. 3. Any of wavelength processing units 302 and 304 of the system as shown in FIG. 3 may be composed of the following four modules:

dual transmitting and receiving module 901 for inputting or outputting a single-wavelength signal, sub-wavelength convergence/de-convergence module 902, wavelength splitting/restoring module 903, and dual transmitting and receiving module 904 for inputting or outputting multiple sub-wavelength traffics or low-rate signals.

In the direction from the transmission line to the traffic signal node cross scheduling system, the functions of each module of wavelength processing unit 302 is described as follows respectively.

Dual transmitting and receiving module 901 is used to send the received single-wavelength signal to wavelength splitting/restoring module 903 if it is determined that the received single-wavelength signal needs to be performed wavelength scheduling; or send the received single-wavelength signal to sub-wavelength convergence/de-convergence module 902 if it is determined that the single-wavelength signal includes multiple sub-wavelength traffics and there are sub-wavelength traffics needing to be scheduled at the current node.

Sub-wavelength convergence/de-convergence module 902 is used to decompose the received single-wavelength signal into multiple sub-wavelength traffics, and send the multiple sub-wavelength traffics to dual transmitting and receiving module 904.

Wavelength splitting/restoring module 903 is used to split the received single-wavelength signal into multiple low-rate signals, and send the multiple low-rate signals to dual transmitting and receiving module 904.

Dual transmitting and receiving module 904 outputs the received multiple sub-wavelength traffics and the low-rate signals.

In the direction from the traffic signal node cross scheduling system to the transmission line, the functions of each module of wavelength processing unit 304 is described as follows respectively.

Dual transmit and receive 904 is used to send the received multiple sub-wavelength traffics to sub-wavelength convergence/de-convergence module 902, and send the received multiple low-rate signals to wavelength splitting/restoring module 903.

Sub-wavelength convergence/de-convergence module 902 is used to converge the received multiple sub-wavelength traffics into a new single-wavelength signal, and send the single-wavelength signal to dual transmitting and receiving module 901.

Wavelength splitting/restoring module 903 is used to restore the received multiple low-rate signals to the single-wavelength signal before split, and send the single-wavelength signal to dual transmitting and receiving module 901.

Dual transmitting and receiving module 901 is used to output the received single-wavelength signal.

Figure 10:
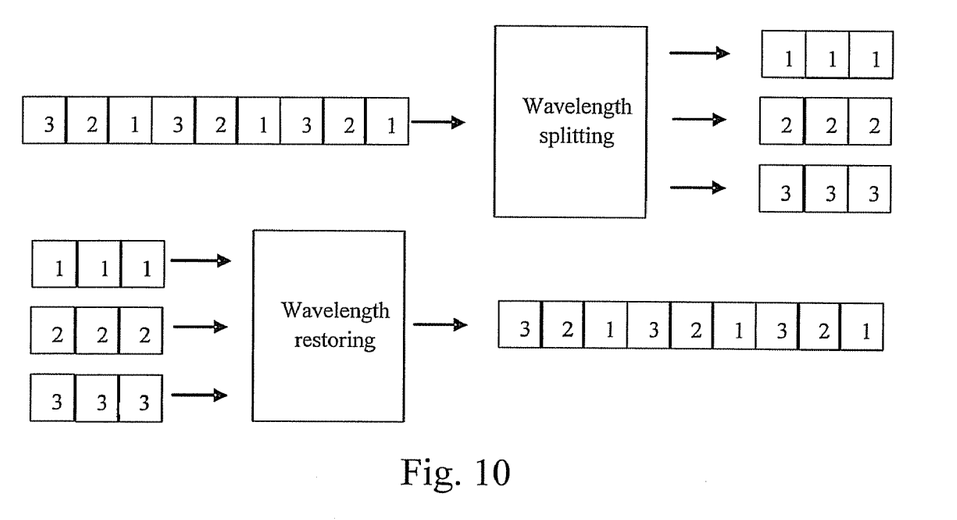
FIG. 10 is a simplified schematic diagram of splitting and restoring wavelength signals by a single-wavelength splitting/restoring module as shown in FIG. 9 according to an embodiment of the present invention.

The process of the wavelength splitting/restoring module in the wavelength processing module as shown in FIG. 9 splitting and restoring the single-wavelength signal is as shown in FIG. 10. The module may split a high-rate single-wavelength signal into multiple low-rate signals in a serial-to-parallel conversion manner, and may also restore the multiple low-rate signals to the single-wavelength signal before split.

To sum up, the foregoing is only preferred embodiments of the present invention and is not for use in limiting the protection scope thereof. Any modification, equivalent replacement or improvement made under the spirit and principles of the present invention is included in the protection scope of the claims of the present invention.

What is claimed is:

1. A traffic signal node cross scheduling method, comprising:

decomposing, by a first wavelength convergence/de-convergence module, a multi-wavelength signal into multiple first single-wavelength signals;

splitting, by a first wavelength processing unit, a first single-wavelength signal into multiple low-rate signals if it is determined that wavelength scheduling needs to be performed for the first single-wavelength signal;

scheduling, by a scheduling matrix, the multiple low-rate signals according to a uniform path;

converging, by a second wavelength processing unit, the multiple low-rate signals after scheduled into the first single-wavelength signal before the first single-wavelength signal is split;

decomposing, by the first wavelength processing unit, the first single-wavelength signal into multiple sub-wavelength traffics if it is determined that the first single-wavelength signal includes multiple sub-wavelength traffics and there is at least one sub-wavelength traffic needing to be scheduled at a current node;

scheduling, by the scheduling matrix, each of the multiple sub-wavelength traffics independently; and converging, by the second wavelength processing unit, the multiple sub-wavelength traffics which have been scheduled and do not need to be downloaded at the current node and sub-wavelength traffics uploaded at the current node into a second single-wavelength signal.

2. The method of claim 1, wherein the splitting the first single-wavelength signal into multiple low-rate signals comprises:

splitting the first single-wavelength signal into the multiple low-rate signals in a serial-to-parallel conversion manner.

3. The method of claim 2, wherein the converging the multiple low-rate signals after scheduled into the first single-wavelength signal before the first single-wavelength signal is split comprises:

restoring the multiple low-rate signals to the first single-wavelength signal before it is split in a parallel-to-serial conversion manner.

4. The method of claim 1, further comprising:

outputting, by the scheduling matrix, sub-wavelength traffics to be downloaded at the current node after scheduling each of the multiple sub-wavelength traffics independently.

5. The method of claim 1, further comprising:

multiplexing, by a second wavelength convergence/de-convergence module, multiple second single-wavelength signals after converged or multiple first single-wavelength signals before split into a new multi-wavelength signal, and sending the new multi-wavelength signal to a transmission line.

6. A traffic signal node cross scheduling system comprising:

a first wavelength convergence/de-convergence module, for decomposing a first multi-wavelength signal into multiple first single-wavelength signals;

a first wavelength processing unit, for splitting a first single-wavelength signal outputted by the first wavelength convergence/de-convergence module into multiple low-rate signals if it is determined that wavelength scheduling needs to be performed for the first single-wavelength signal, and decomposing the first single-wavelength signal into multiple sub-wavelength traffics if it is determined that the first single-wavelength signal includes multiple sub-wavelength traffics and there is at least one sub-wavelength traffic needing to be scheduled at a current node;

a scheduling matrix, for scheduling the multiple low-rate signals outputted by the first wavelength processing unit according to a uniform path, and independently scheduling each of the multiple sub-wavelength traffics outputted by the first wavelength processing unit; and a second wavelength processing unit, for converging the multiple low-rate signals after scheduled into the first single-wavelength signal before split, and converging the multiple sub-wavelength traffics which have been scheduled and do not need to be downloaded at the current node and sub-wavelength traffics uploaded at the current node into a second single-wavelength signal.

7. The system of claim 6, wherein the first wavelength processing unit comprises:

a first dual transmitting and receiving module, for outputting the first single-wavelength signal when determining that wavelength scheduling needs to be performed for the first single-wavelength signal; and outputting the first single-wavelength signal when determining that the first single-wavelength signal includes multiple sub-wavelength traffics and there is at least one sub-wavelength traffic needing to be scheduled at a current node;

a sub-wavelength convergence/de-convergence module, for decomposing the first single-wavelength signal received from the first dual transmitting and receiving module into the multiple sub-wavelength traffics, and outputting the multiple sub-wavelength traffics;

a wavelength splitting/restoring module, for splitting the first single-wavelength signal received from the first dual transmitting and receiving module into multiple low-rate signals and outputting the multiple low-rate signals; and a second dual transmitting and receiving module, for outputting the multiple sub-wavelength traffics received from the sub-wavelength convergence/de-convergence module and outputting the multiple low-rate signals received from the wavelength splitting/restoring module to the scheduling matrix.

8. The system of claim 6, wherein the second wavelength processing unit comprises:

a third dual transmitting and receiving module, for outputting the multiple sub-wavelength traffics or outputting the multiple low-rate signals;

a sub-wavelength convergence/de-convergence module, for converging the multiple sub-wavelength traffics received from the third dual transmitting and receiving module into the second single-wavelength signal and outputting the second single-wavelength signal;

a wavelength splitting/restoring module, for restoring the multiple low-rate signals received from the third dual transmitting and receiving module to the first single-wavelength signal before split, and outputting the first single-wavelength signal before split; and a fourth dual transmitting and receiving module, for outputting the second single-wavelength signal received from the sub-wavelength convergence/de-convergence module or the first single-wavelength signal before split received from the wavelength splitting/restoring module to a second wavelength convergence/de-convergence module.

9. The system of claim 6, wherein the scheduling matrix is a sub-wavelength scheduling matrix.

10. The system of claim 6, further comprising:

a second wavelength convergence/de-convergence module, for multiplexing multiple second single-wavelength signals after converged or multiple first single-wavelength signals before split into a new multi-wavelength signal, and sending the new multi-wavelength signal to a transmission line.

11. A traffic signal node cross scheduling system in an optical electric integrated circuit, comprising:

a first wavelength convergence/de-convergence module, for decomposing a first multi-wavelength signal into multiple first single-wavelength signals;

a first wavelength processing unit, for splitting a first single-wavelength signal outputted by the first wavelength convergence/de-convergence module into multiple low-rate wavelength signals if it is determined that wavelength scheduling needs to be performed for the first single-wavelength signal, and decomposing the first single-wavelength signal into multiple sub-wavelength traffics if it is determined that the first single-wavelength signal includes multiple sub-wavelength traffics and there is at least one sub-wavelength traffic needing to be scheduled at a current node;

a scheduling matrix, for scheduling the multiple low-rate signals outputted by the first wavelength processing unit according to a uniform path, and independently scheduling each of the multiple sub-wavelength traffics outputted by the first wavelength processing unit; and a second wavelength processing unit, for converging the multiple low-rate signals after scheduled into the first single-wavelength before split, and converging the multiple sub-wavelength traffics which have been scheduled and do not need to be downloaded at the current node and sub-wavelength traffics uploaded at the current node into a second single-wavelength signal.

12. The system of claim 11, wherein the wavelength convergence/de-convergence module comprises a wavelength convergence unit, one or more modulated light source arrays, and a data channel;

the one or more modulated light source arrays are connected with the wavelength processing unit through the data channel, and is used for receiving the first single-wavelength signal sent from the wavelength processing unit through the data channel, and sending the first single-wavelength signal to the wavelength convergence unit after modulating the first single-wavelength; and the wavelength convergence unit is used for multiplexing all second single-wavelength signals received into the second multi-wavelength signal.

13. The system of claim 12 wherein the wavelength convergence/de-convergence unit is implemented by an Array Wave-guide Grating (AWG), an N×1 Planar Lightware Circuit (PLC) waveguide multiplexer, a star multiplexer, or a Multi-mode Interferometry (MMI).

14. The system of claim 11, wherein the wavelength convergence/de-convergence module comprises:

a wavelength de-convergence unit, for decomposing the first multi-wavelength signal into multiple first single-wavelength signals;

an optical receiving module, for outputting multiple electric signals after converting the multiple first single-wavelength signals into the multiple electric signals; and a data restoring unit, for sending the multiple electric signals received from the optical receiving module to the wavelength processing unit after amplifying and re-generating the multiple electric signals.

15. The system of claim 11, further comprising:

a second wavelength convergence/de-convergence module, for multiplexing multiple second single-wavelength signals after converged or multiple first single-wavelength signals before split into a new multi-wavelength signal, and sending the new multi-wavelength signal to a transmission line.

* * * * *